United States Patent [19]
Dufour

[11] Patent Number: 5,528,937
[45] Date of Patent: Jun. 25, 1996

[54] CAPACITIVE SENSOR SENSITIVE TO THE ACCELERATIONS ORIENTATED IN ALL THE DIRECTIONS OF A PLANE

[75] Inventor: Michel Dufour, Grenoble, France

[73] Assignee: Commissariat a l'Energie Atomique, France

[21] Appl. No.: 161,649

[22] Filed: Dec. 2, 1993

[30] Foreign Application Priority Data

Dec. 8, 1992 [FR] France ............................ 92 14758

[51] Int. Cl.[6] ................................................ G01P 15/125
[52] U.S. Cl. .................................................... 73/514.32
[58] Field of Search ........................... 73/514.01, 514.16, 73/514.32

[56] References Cited

U.S. PATENT DOCUMENTS

| | | | |
|---|---|---|---|
| 4,653,326 | 3/1987 | Danel | 73/514.21 |
| 4,711,128 | 12/1987 | Boura | 73/514.29 |
| 4,901,570 | 2/1990 | Chang | 73/514.29 |
| 5,121,180 | 6/1992 | Beringhause | 73/514.34 |
| 5,209,117 | 5/1993 | Bennett | 73/514.16 |

FOREIGN PATENT DOCUMENTS

| | | |
|---|---|---|
| 0323709 | 7/1989 | European Pat. Off. . |
| 0479686 | 4/1992 | European Pat. Off. . |

*Primary Examiner*—Hezron E. Williams
*Assistant Examiner*—Christine K. Oda

[57] ABSTRACT

A capacitive acceleration sensor is composed of two electrodes placed on a support and a mobile inertial mass connected to the support by a rigid frame and blades. The network of blades is selected so that the acceleration inside the plane of the blades causes a uniform movement of the upper electrode, irrespective of the direction of acceleration.

16 Claims, 5 Drawing Sheets

CAPACITIVE SENSOR SENSITIVE TO THE ACCELERATIONS ORIENTATED IN ALL THE DIRECTIONS OF A PLANE

FIELD OF THE INVENTION

The invention concerns a capacitive sensor sensitive to the accelerations orientated in all the directions of a plane.

BACKGROUND OF THE INVENTION

Capacitive sensors include two electrodes constituting a capacitor, one electrode being placed on a fixed support and the other on a mobile inertial mass and connected to the support by a structure able to be deformed according to the accelerations undergone. This structure may include a spring or an equivalent system. However, there currently exists no capacitive acceleration structure accessible to the general public which can be used in satisfactory conditions for any directional accelerations within a plane, that is one provided with a uniform sensitivity regardless of the direction of acceleration within the plane or at least whose sensitivity is known according to the direction of acceleration and which then indicates this direction, so as to be able to nevertheless properly calculate the value of the acceleration.

SUMMARY OF THE INVENTION

The object of the invention is to overcome this drawback and concerns a sensor characterized in that the inertial mass is connected to a frame integral with the support by a system of ductile blades and exhibiting an identical assembly stiffness as regards all the directions of the detection plane, the system of blades belonging to this plane. Furthermore, it is dimensionally stable perpendicular to the plane.

The electrodes may be concentric according to an axis perpendicular to the plane, or may be flat and circular ones can be provided, or, if it is desired to detect not merely the acceleration but its direction, an oblong electrode (elliptic, rectangular or losenge-shaped, for example) could be provided and divided into four sections by two perpendicular main axes of the electrode.

The blades, all provided with the characteristic feature mentioned above, shall often be connected obliquely to the frame and inertial mass or curved. They could be identical and evenly distributed angularly around the inertial mass.

BRIEF DESCRIPTION OF THE DRAWINGS

There now follows a non-restrictive illustrative description of certain embodiments of the invention with reference to the accompanying drawings on which.

DETAILED DESCRIPTION OF THE PREFERRED EMBODIMENTS

Figure 1:
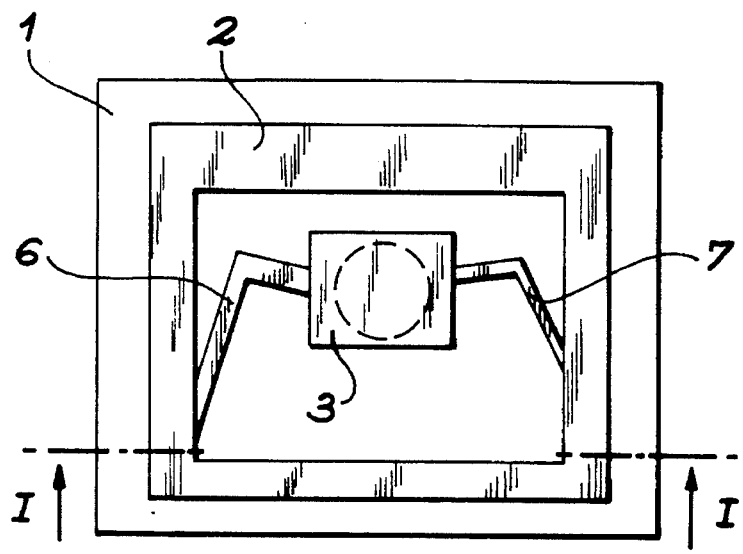
FIG. 1 represents a top view of an embodiment.
Figure 2:
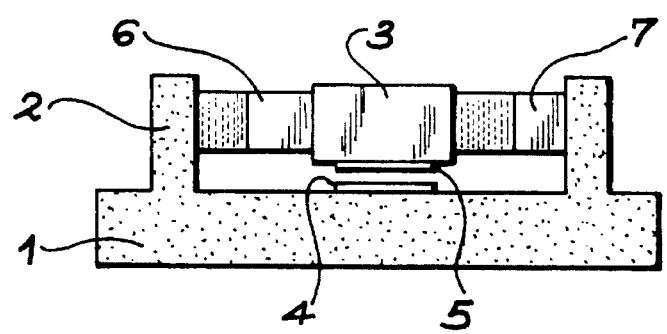
FIG. 2 represents a section along the line I—I of FIG. 1.

FIGS. 1 and 2 show a solid support 1, a rectangular frame 2, also solid, electroplated to the support 1 via its lower face or together with a block, an inertial mass 3 encompassed by the frame 2 and at any distance from the support 1, one lower electrode 4 placed on the support 1, one upper electrode 5 placed under the inertial mass 3, and two blades 6 and 7 combined via their ends to the frame 2 and the inertial mass 3 and intended to suspend the latter. The support 1, the electrodes 4 and 5 and the blades 6 and 7 mainly extend inside horizontal planes with the selected representation.

The electrodes 4 and 5 are connected by electric connections (not shown) to a measuring system; they are both circular with the same diameter and are fully opposite each other when the sensor is in an idle position, but any acceleration moves the upper electrode 5 owing to the inertia of the inertial mass 3 and flexibility of the blades 6 and 7, and a change of capacity can be measured, this capacity depending on the movement of the upper electrode 5 but not its direction owing to the concentricity and circularity of the electrodes 4 and 5. Moreover, the system constituted by the inertial mass 3 and the blades 6 and 7 is such that an acceleration within the horizontal plane produces an invariable movement regardless of the direction of acceleration. This characteristic feature mainly results from the rigidities, shapes and respective positons of the blades 6 and 7, which in this instance are plates approximately curved at a right angle and each formed with a branch connected to the inertial mass 3 with a relatively small amount of obliqueness and another branch connected to the frame 2 with greater obliqueness, that is when the first branches are almost radial with respect to the center of the electrodes 4 and 5, the other branches being rather tangent to circles concentric to the electrodes 4 and 5. The differing degrees of obliqueness can be described geometrically as having both of the angles formed between a blade and the inertial mass being smaller than the largest of the two angles formed between the blade and the frame. The blades 6 and 7 are obviously much thinner in the horizontral direction where it is desired to measure the accelerations than in the vertical direction where it is sought to obtain extreme rigidity which may be considered as infinite, as can be seen by comparing FIGS. 1 and 2. As shown in FIG. 1, the blades 6 and 7 are connected directly to the faces of the inertial mass and the frame by way of the straight line segments of the blades. The point of attachment is characterized by a direct connection, in this case oblique, whereby the blade intersects the straight face as the intersection of a straight line. The natural result is that two supplementary angles, i.e. adding up to a total of 180 degrees, are formed on either side of the blade.

The blades 6 and 7 are connected to opposing faces of the inertial mass 3 and the frame 2 and the unit thus formed is slightly antisymmetrical. Experts in this field are able to find a large number of solutions as a large amount of freedom is available to shape the elements of the system. However, these solutions are too numerous to all be described here. Systems with a single blade may probably exist, but the inventor is merely concerned with systems with several blades as the sought-after property of uniformity of rigidities is much more easily attained if there are a large number of blades without significantly complicating the production of the sensor, as shall been seen later.

Figure 3:
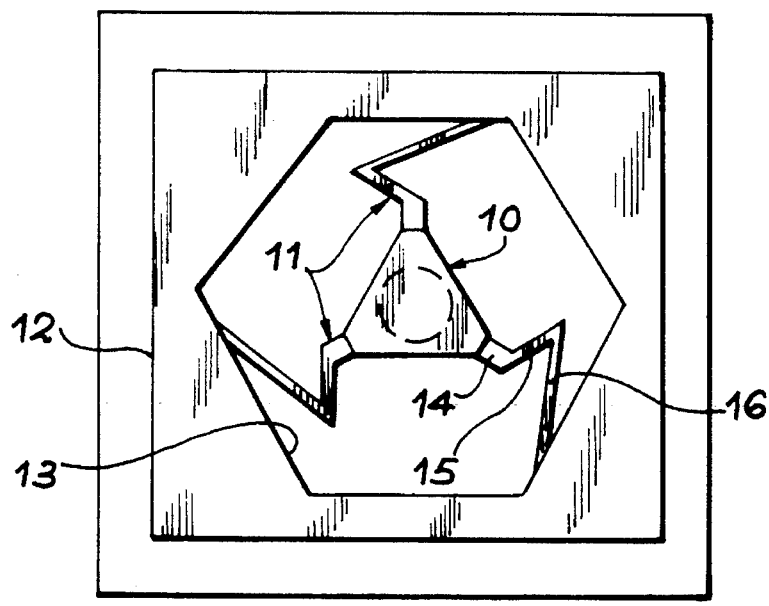
FIG. 3 represents a top view of a second embodiment.
Figure 7:
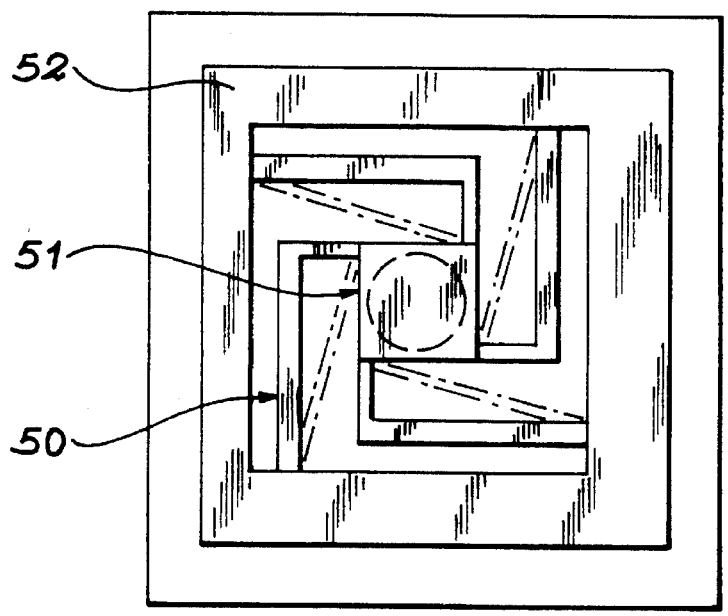
FIG. 7 represents a top view of a fifth embodiment.

FIG. 3 shows a triangular inertial mass 10 with broken angles (to give a hexagonal shape) where three similar blades 11 are connected, the latter also being connected to a frame 12 having one hexagonal internal edge 13. The other elements are the same as those of the first embodiment. The structure obtained is periodical as regards the inertial mass 10, the blades 11 and the internal edge 13 of the frame 12, and the angle of periodicity is 120°. Each of the blades 12 is composed of three portions: a short solid connector 14 at a broken angle of the inertial mass 10, one intermediate thin portion 15 and at a right angle with the connector 14, and a third long thin portion 16 connected to the intermediate portion 15 and at the internal edge 13 of the frame 12, thus forming two acute angles with them. In general, one skilled in the art will realize that an inertial mass in the shape of any polygon can function advantageously with a frame in the shape of a polygon which follows the pattern of the inertial mass, as shown in FIGS. 1, 3, 7 (i.e. rectangle, hexagon, square).

Figure 4:
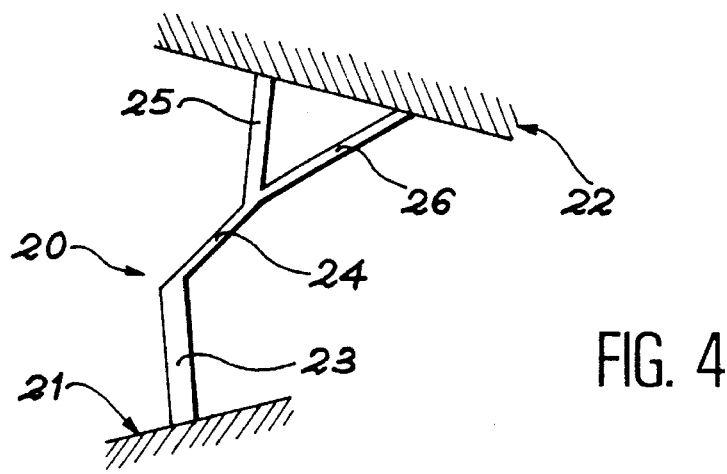
FIG. 4 represents an embodiment variant.

FIG. 4 shows the details of another admissible form of blades 20 between one inertial mass 21 and a frame 22 which are only partly shown. The blade 20 again includes a short solid connector 23 connected to the inertial mass 21 approximately at a right angle, one third portion 24, but the third portion connected to the frame 22 is split into two branches 25 and 26 which form an acute angle and have a significant overall rigidity. Most of the deformation is therefore undergone by bending the intermediate portion 24.

Figure 5:
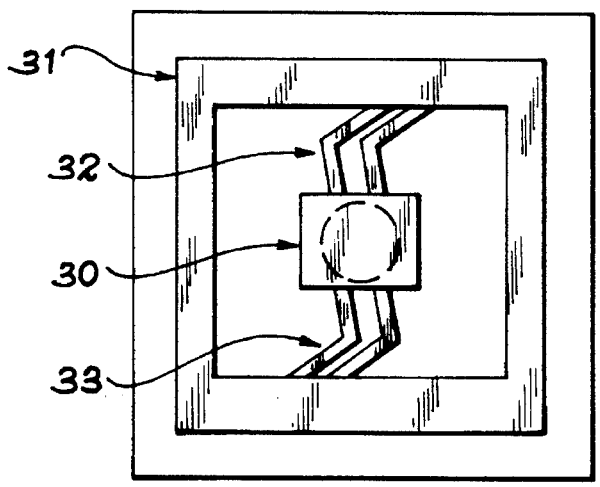
FIG. 5 represents a top view of a third embodiment.

FIG. 5 shows an inertial mass 30 and a frame 31 similar to those of the first embodiment whereby said elements may be connected by two bundles 32 and 33 of curved blades similar to those of the preceding figures. The blades of each bundle are similar or almost similar to one another and formed of branches parallel to the corresponding branches of the other blades of the bundle 32 or 33.

Figure 6:
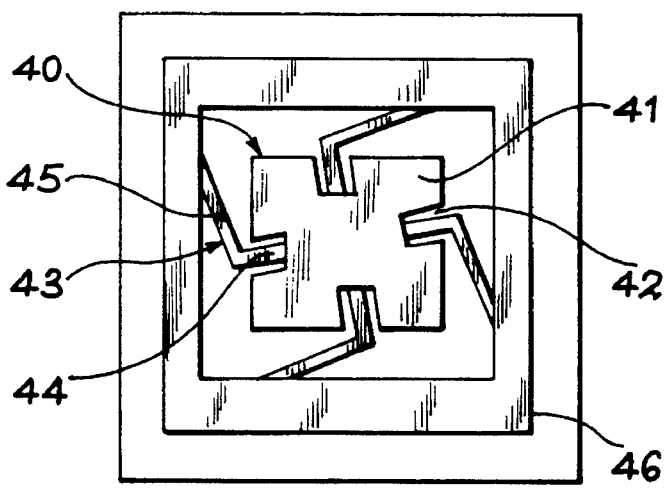
FIG. 6 represents a view of a fourth embodiment.

FIG. 6 shows that an interesting possibility for rendering the system more sensitive consists of using an inertial mass 40 formed of projecting portions 41 which alternate with indentations 42. The blades 43, bent as in the preceding embodiments, are composed of one portion 44 linked to the inertial mass 40 which extends into a respective indentation 42 and is secured to the bottom of the latter. The other portion 45 of the blades 43 is connected obliquely to the frame 46. Thus, a heavier inertial mass is obtained without it being necessary to use shorter and thus less flexible blades 43. The sensor is thus more sensitive than the preceding ones. Here again, the structure is periodic, at 90° this time, since there are four blades 43 and the inertial mass 40 and the frame 46 are square.

A different embodiment is shown on FIG. 7. It comprises four blades 50, again bent and formed of two unequal branches, each branch being connected to one extremity of one side of the inertial feeder 51 and via the other extremity close to the extremity of one side of the frame 52. The inertial feeder 51 and the frame are square. The ductile and elastic unit has the shape of a swastika and its main advantage resides in the considerable flexibility of the blades 50. It may also be advantageous for the two branches of each of the blades 50 to have differing widths in the direction of the plane.

Instead of using the bent blades in this embodiment, it would be more advantageous to use rectilinear blades which would be connected to the frame 52 and the inertial mass 51 at the same points, as illustrated by the broken lines.

Figure 8:
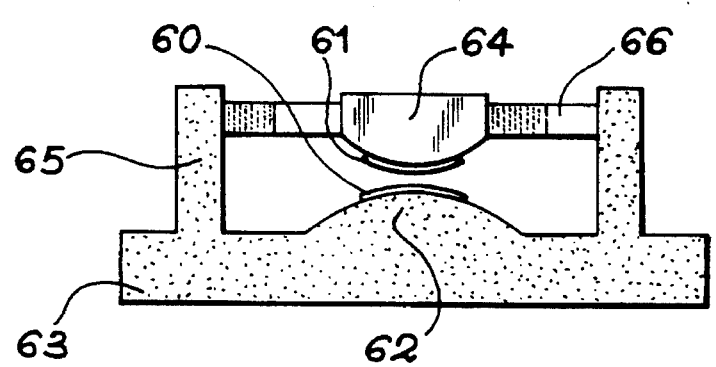
FIG. 8 represents a cross section of a sixth embodiment.

FIG. 8 shows that the electrodes may not be flat but may assume other shapes and, for example, both be convex. The lower electrode 60 and the upper electrode 61 are in this instance placed on a spherical cap 62 of a flat support 63 and on a spherical cap bottom of an inertial mass 64. The frame 65 and the blades 66 may correspond to the preceding embodiments. In this embodiment, the electrodes 60 and 61 remain concentric with the same shape and diameter.

Figure 9:
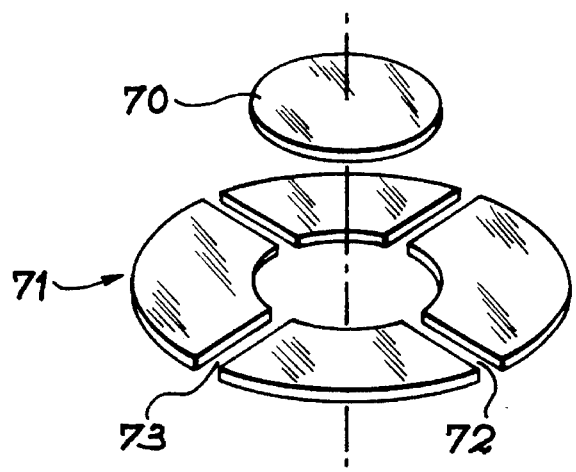
FIG. 9 represents a perspective view of a seventh embodiment.

One particular form of electrodes is shown on FIG. 9. The upper electrode 70 remains circular, but the lower electrode 71 is a circular crown split into four identical areas with the aid of two diametrical and perpendicular cuts 72 and 73. It can be instantly understood that if each of the four areas has a particular electric connection, the combination of the capacities obtained between the upper electrode 70 and each of the areas of the lower electrode 71 shall make it possible to distinguish the direction of acceleration by comparing the capacities obtained for the opposing areas and the neighbouring areas. One variant of this configuration consists of rendering dissymmetrical the four electrodes by replacing, for example, the circular crown by an elliptic crown so as to obtain greater sensitivity in an overriding direction.

Figure 10:
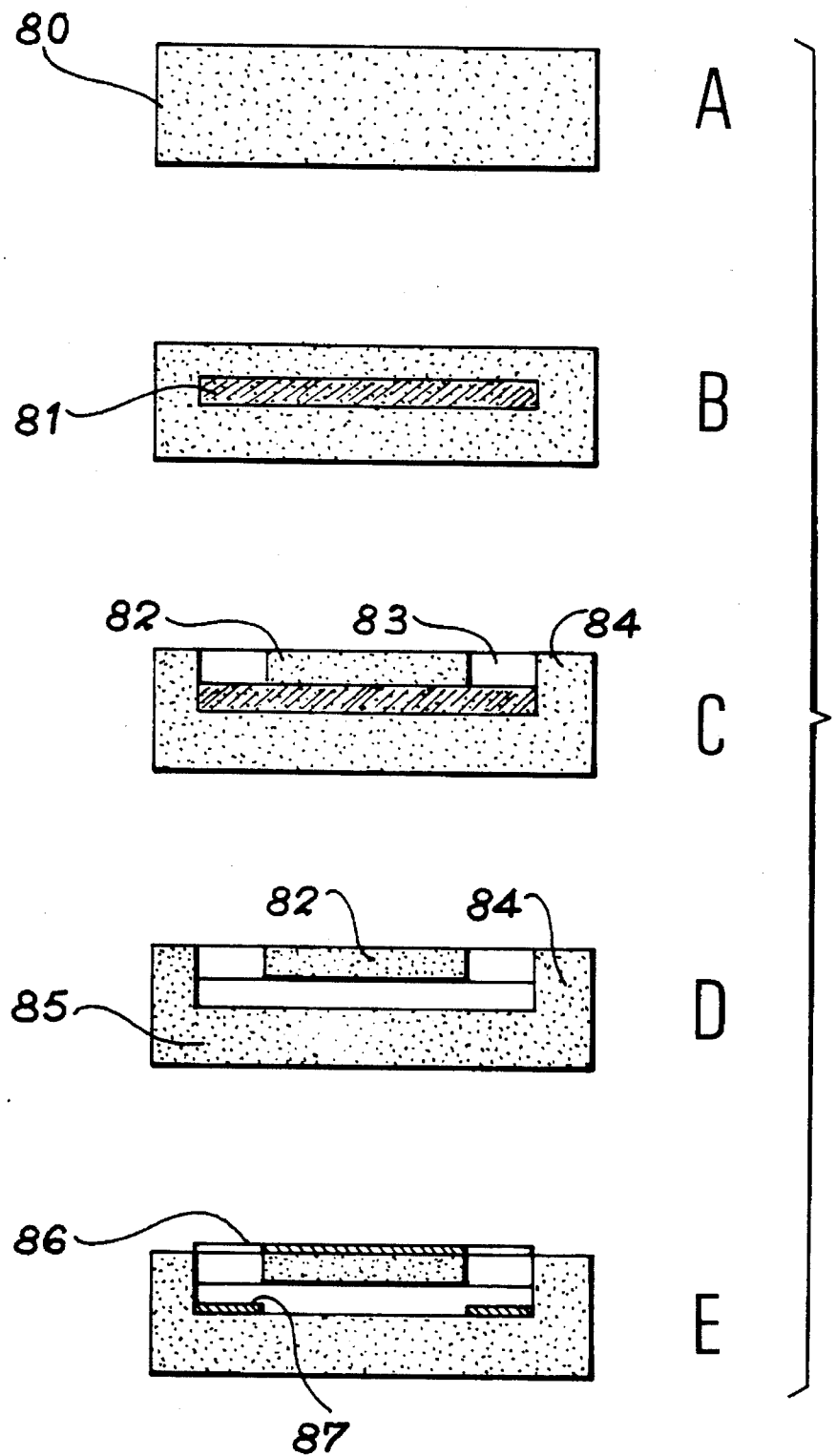
FIGS. 10A to 10E represent a cycle of stages for producing a sensor.
Figure 11:
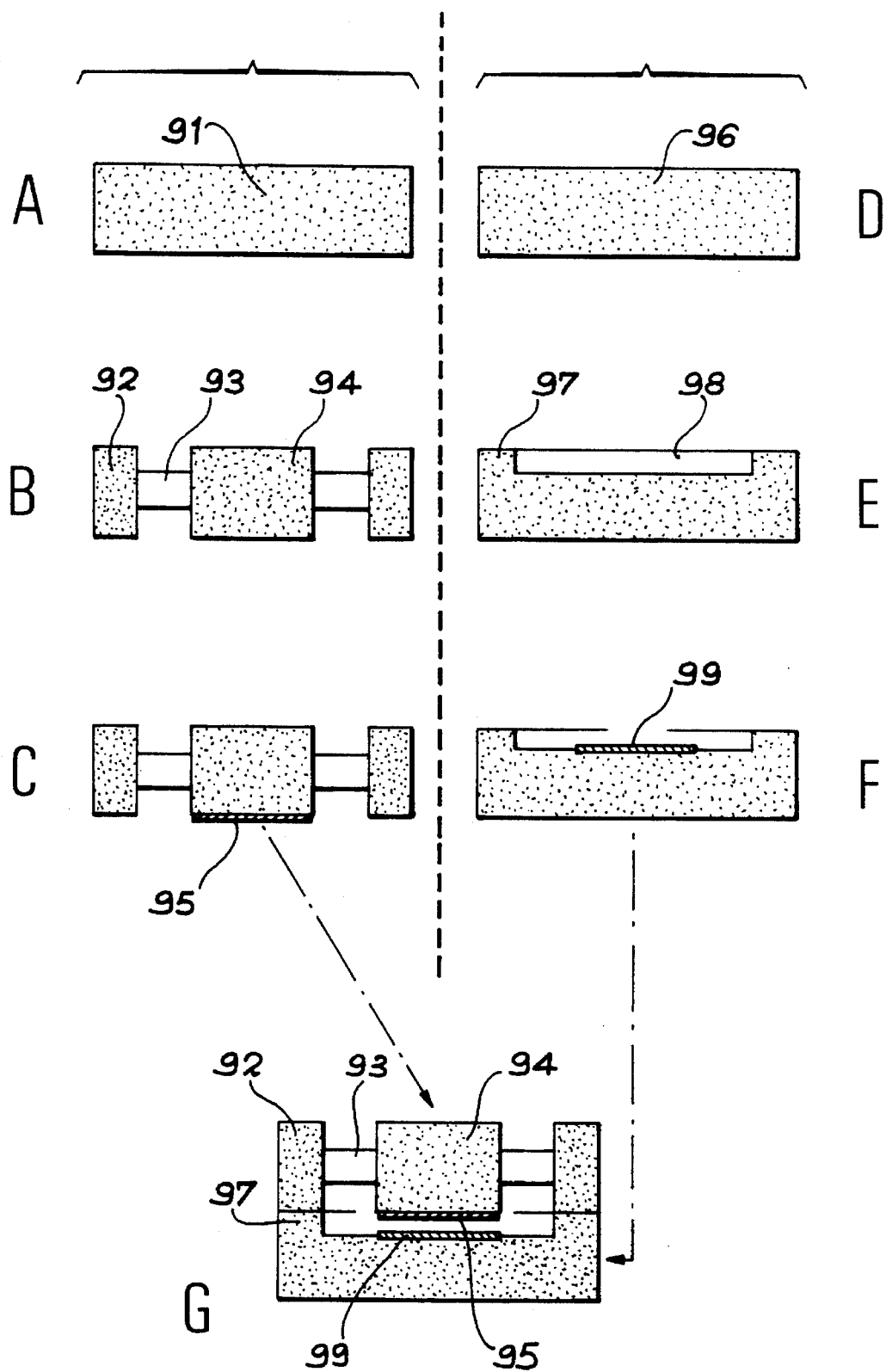
FIGS. 11A to 11G represent another cycle of stages for producing a sensor.

Finally, FIGS. 10 and 11 represent the stages for producing the sensor. Generally speaking, normal microelectronic techniques are used to produce integrated circuits so as to obtain extremely small dimensions and extreme accuracy. FIG. 10A represents a block 80 intended to form the sensor and is made of an electricity nonconducting material. It is possible to create there at a certain depth a film 81 of a soluble material by implanting ions without however extending it as far as the lateral faces of the block 80 (FIG. 10B). An etching is then carried out as far as the film 81 in recesses 83 so as to isolate a central portion forming an inertial mass 82 whilst in addition (FIG. 10C) leaving portions of the basic material available intended to form the frame 84 and the blades (between the recesses 83 which are invisible on this figure). To this effect, a mask is used.

The next stage is shown on FIG. 10D and consists of dissolving the film 81 so that the inertial mass 82 is now fully freed. It then merely suffices to place a conductive material by means of metallization so as to form one upper electrode 86 on the inertial mass 82 and the blades, and one lower electrode 87 on the circular area of the support 85 circumscribed by the frame 84 and circumscribing the inertial mass 82. In fact, it is not essential that the electrodes 86 and 87 are directed in relation to each other or even opposite each other, as has been represented up until now.

Reference is now made to FIGS. 11. FIG. 11A represents a block 91 which is etched during several stages, the result of this being shown on FIG. 11B: one upper portion of the frame 92 is formed at the same time as the blades 93 and the inertial mass 94. A metallization is then carried out to place an upper electrode 95 below the inertial mass 94 (FIG. 11C). Another block 96 shown on FIG. 11D is etched at its center which allows the base 97 of the frame to appear in relief (FIG. 11E). When a metallization shown on FIG. 11F has produced a lower electrode 99 at the center of the basin 98, the final stage consists of glueing the two portions 92 and 97 of the frame together so as to obtain the sensor of FIG. 11G.

In this embodiment, the two blocks 91 and 96 were electricity nonconductors. However, it is possible that one of the blocks could be a conductor which would then need one portion of its active surface to be coated by a nonconductive material.

What is claimed is:

1. Acceleration sensor including two electrodes comprising a capacitor, one electrode being located on a fixed support and the other electrode being located on an inertial mass, wherein the inertial mass is connected to a frame integral with the support by means of a system of ductile blades situated parallel to the plane of the inertial mass, the ductile blades having an identical rigidity as regards all the directions of the plane and being dimensionally stable perpendicular to the plane, the width of the blades in a direction parallel to the plane being less than the width of the each of said blades in a direction perpendicular to the plane throughout the entire length of each of said blades, wherein the electrodes are concentric along an axis perpendicular to the plane.

2. Acceleration sensor according to claim 1, wherein the electrodes are flat.

3. Acceleration sensor according to claim 2, wherein the electrodes are circular.

4. Acceleration sensor according to claim 2, wherein one of the electrodes is a circular crown and divided into four portions via two perpendicular cutting diameters.

5. Acceleration sensor according to claim 2, wherein one of the electrodes is oblong and divided into four portions by two main and perpendicular cutting axes.

6. Acceleration sensor according to claim 1, wherein the blades are grouped into bundles, the blades of a bundle being parallel to one another.

7. Acceleration sensor according to claim 1, wherein the blades are branched.

8. Acceleration sensor according to claim 1, wherein the inertial mass includes portions protruding between the blades.

9. Acceleration sensor according to claim 1, wherein each of said blades has at least a first segment and a second segment, said first and second segments having a different width from each other measured in the direction of the plane.

10. Acceleration sensor including two electrodes comprising a capacitor, one electrode being located on a fixed support and the other electrode being located on an inertial mass, wherein the inertial mass is connected to a frame integral with the support by means of a system of ductile blades situated parallel to the plane of the inertial mass, the ductile blades having an identical rigidity as regards all the directions of the plane and being dimensionally stable perpendicular to the plane, the width of the blades in a direction parallel to the plane being less than the width of the each of said blades in a direction perpendicular to the plane throughout the entire length of each of said blades, wherein each of said blades is connected obliquely to a face of the frame and a face of the inertial mass.

11. Acceleration sensor including two electrodes comprising a capacitor, one electrode being located on a fixed support and the other electrode being located on an inertial mass, wherein the inertial mass is connected to a frame integral with the support by means of a system of ductile blades situated parallel to the plane of the inertial mass, the ductile blades having an identical rigidity as regards all the directions of the plane and being dimensionally stable perpendicular to the plane, the width of the blades in a direction parallel to the plane being less than the width of the each of said blades in a direction perpendicular to the plane throughout the entire length of each of said blades, wherein the outside perimeter of the inertial mass and the inside perimeter of the frame are both rectangles having faces, such that for each of said faces of the inertial mass there is a corresponding face of the frame situated opposite therefrom, and one of said blades is connected between one of said faces of the inertial mass and a connecting face of the frame, said connecting face of the frame being adjacent to said corresponding face of the frame.

12. Acceleration sensor according to claim 11, wherein the blades are each composed of at least two integral segments having longitudinal axes meeting at an angle.

13. Acceleration sensor according to claim 12, wherein each of said blades is composed of two of said integral segments meeting at approximately a right angle.

14. Acceleration sensor according to claim 13, wherein each of said blades meets one of said faces of the inertial mass and one of said faces of the frame at a right angle.

15. Acceleration sensor according to claim 12, wherein each of said blades is obliquely connected to one of said faces of the inertial mass and said connecting face of the frame.

16. Acceleration sensor including two electrodes comprising capacitor, one electrode being located on a fixed support and the other electrode being located on an inertial mass, wherein the inertial mass is connected to a frame integral with the support by means of a system of ductile blades situated parallel to the plane of the inertial mass, the ductile blades having an identical rigidity as regards all the directions of the plane and being dimensionally stable perpendicular to the plane, the width of the blades in a direction parallel to the plane being less than the width of the each of said blades in a direction perpendicular to the plane throughout the entire length of each of said blades, wherein a first and second angle are formed at a first location where a first end of one of said blades of said system of ductile blades is connected to a face of the frame and a third and fourth angle are formed at a second location where a second end of said one of said blades is connected to a face of the inertial mass, said first angle is formed between a first side of the first end of said one of said blades and the face of the frame, and the second angle is formed between a second side of the first end of said one of said blades and the face of the frame, said third angle is formed between a first side of the second end of said one of said blades and the face of the inertial mass, and the fourth angle is formed between a second side of the second end of said one of said blades and the face of the inertial mass, the sum of the first and second angles at said first location being 180 degrees, and the sum of the third and fourth angles being 180 degrees at said second location.

* * * * *